Patented Feb. 26, 1946

2,395,676

UNITED STATES PATENT OFFICE 2,395,676

CONDENSATION PRODUCTS AND PROCESSES FOR PRODUCING THE SAME

Harold J. Luth, Muskegon Heights, and Kenneth J. Gregory, Muskegon, Mich., assignors to The Brunswick-Balke-Collender Company, Chicago, Ill., a corporation of Delaware No Drawing. Application April 17, 1941, Serial No. 388,996

10 Claims. (Cl. 260—38)

More particularly the invention relates to a method of reacting with formaldehyde upon phenol or on a phenolic body and to the product resulting from such reaction.

It is an object of the invention to provide a resin with specific gravities in excess of 1.4.

Another object is to provide a resin with high resistance to heat and abrasion resulting from frictional heat and wear occasioned from the resin being drawn across or caused to slide across an abrading surface, such for example as a ball on a cloth covering on a billiard table.

Another object is to produce a resin having a light appearance which is relatively stable to light, of uniform color, and free from clouds or disintegrate coloration.

Another object is to produce a resin whose surface will be unaffected by ordinary weak acids or alkalies or solvents which might ordinarily be used in cleaning and polishing agents.

Another object is to provide a resin suitable for use in the manufacture of billiard balls, which has a specific gravity such as is required in a billiard ball, and which will have an attractive appearance, unaffected by light, aging or normal usage.

Another object is to produce a resin capable of being poured into molds of lead, glass, rubber or other materials which have no action upon the resin, and can subsequently be hardened by the action of heat for a period of 48 hours to 60 hours, and then hardened to a stable product with the desirable properties herein set forth, by treatment in the absence of light or air in a liquid subjected to heat and pressure for a period of approximately 5 to 6 hours and at a temperature of the order of 230 degrees F.

Other objects will become more readily apparent from the following detailed description of a preferred form of the invention.

In pursuance of the foregoing objects, the invention consists, generally, in reacting upon phenol with formaldehyde in the presence of a basic condensing agent, as for example barium hydroxide, until such condensation is substantially complete, the addition of a quantity of barium hydroxide sufficient to react with sulfuric acid to produce a precipitative barium sulfate which will remain uniformly dispersed throughout the mass of the resin and whose particle size is nearly that of the wave length of light, thereby not causing a pigmenting effect upon the resin and attaining a desired specific gravity above 1.4 (preferably of 1.71), subsequently precipitating the barium sulfate by the addition of the stoichiometric quantity of sulfuric acid necessary to complete the precipitating of the residual barium hydroxide used in condensation and the barium hydroxide added to attain the desired specific gravity of 1.71 or more.

The resulting mixture is acidified with an acid, as for example acetic, lactic, phosphoric, phthalic, boric, etc., sufficient to convert the mixture from an alkaline state to a very weak acid state, and this is followed by distillation under vacuum to remove the excess water developed in the various reactions and the excess water in which the barium hydroxide, added for the purpose of increasing the specific gravity, would be dissolved, until the residual water in the resin will be the order of 6% or less. This mass is poured into suitable molds and hardened for a period of 48 to 60 hours at atmospheric pressure at a temperature of 75 degrees to 80 degrees C. Subsequently the material is hardened by treatment in the absence of air or light while immersed in liquid under heat and pressure. This final hardening of the material may be in accordance with the process more fully disclosed in the co-pending application of Harold J. Luth, Serial Number 381,506, filed March 3, 1941.

In the preferred form of our invention we used the following formula:

| | | |
|---|---|---|
| Phenol | grams | 440 |
| Formaldehyde (37%) | do | 836 |
| BA(OH)$_2$.8H$_2$O | do | 33 |
| BA(OH)$_2$.8H$_2$O | do | 446 |
| Sulfuric acid (.6772 grs. acid per cc) | cc | 220 |
| Lactic acid (90%) | grams | 6.84 |

A solution is made of the first three items mixed by agitation and filtered. This solution is heated in a flask equipped with a reflux condenser to a gentle boil and boiled for half an hour, either with or without agitation, and at the end of the half hour period the reflux condenser is removed and the flask connected with a vacuum pump. In the meantime the 446 grams of barium hydroxide is dissolved in 550 cc.'s of hot water and this is added to the resin mixture in the flask. Receptacles which contained the barium hydroxide are rinsed with an additional 50 cc. of water and the rinse water added to the batch. The barium hydroxide is now precipitated by the addition of the 220 cc. of sulfuric acid; the containers for the acid are rinsed with a small amount of distilled water and 6.84 grams of 90% lactic acid added. The vacuum on the flask is increased until the foaming ceases, and then heat is applied and the mixture is boiled under a vacuum of 70 millimeters or less for a period of 5 to 6 hours. As the boiling proceeds the material in the flask is of the appearance of milk due to the presence of precipitated barium sulfate; it becomes less and less opaque, and as the water is distilled off and the boiling point of the mixture rises until finally the mixture has the appearance of honey and the temperature has risen to 75 degrees to 80 degrees C. with the vacuum on the order of 60 millimeters. At this point the heating is discontinued and the mass is sufficiently fluid to be poured into molds or forms. The forms are placed in an oven and heated with hot air under atmospheric pressure for from 48 to 80 hours at a temperature of 75 degrees to 85 degrees C. The objects are then removed from the molds and hardened in the absence of light and air in a liquid, heated under pressure, as more clearly disclosed in the copending application referred to hereinbefore.

In this example the molecular ratio of the formaldehyde to the phenol is approximately 2.2 and the barium sulphate precipitated in the resin comprises approximately 36.6 percent of the final product.

During the alkaline condensation the time of reaction may be varied within wide limits and need not necessarily be at the boiling point of the reaction mixture, although this is customary and convenient. Usually prolonging the boiling for longer than three quarters of an hour is unnecessary, but no harm is done if at the end of the alkaline condensation the reaction has not progressed to such an extent that upon the addition of the precipitable barium hydroxide solution the reaction continued to produce a resin hydrophobic in the reaction mixture. If desired the alkaline condensation product can be cooled prior to the addition of the precipitable barium hydroxide providing the alkaline condensation has not been prolonged to the extent that a resin hydrophobic when cold is produced. Likewise it is permissible to reduce the alkaline condensation boiling time to as little as 15 minutes in which event it is not advisable to cool the mixture before addition of the precipitable barium hydroxide, it being apparent that a measure of alkaline condensation must of necessity take place in the interim between the addition of the precipitable barium hydroxide and the sulfuric acid.

It is well known in the art that removal of water can be facilitated by the addition of various aids, for example, glycerine, triacetin, butyl, alcohol, and the like. The use, however, of such aids in my invention must be done with discretion, as it is a common property of these aids that residual amounts of these aids do make softer, more easily machineable plastics, which would be contrary to the objects of the invention. Variations of the precipitable salt could be made by one versed in the art; for example, barium carbonate could be used; we prefer the hydroxide, to avoid the effervescence which would result from the liberation of carbon dioxide gas. Barium hydroxide is the choice of the preferred form of our invention as the alkaline catalyst for the obvious reason that it will be precipitated by the added sulfuric acid in the same manner and indistinguishably dispersed state as the precipitative barium hydroxide. We have designated for clarity, that portion of the barium hydroxide added after the addition of the barium hydroxide used for condensation as "precipitative" or "precipitable" in contradistinction to that devoted to the condensation reaction.

Although we have disclosed a particular form of product and a preferred method of making the product of our invention, it has been done with no intent to limit the scope of the invention. The scope of the invention is expressed in the appended claims.

We claim:

1. A process which comprises condensing together phenol and formaldehyde in the presence of an alkaline catalyst to form an aqueous solution of a water soluble phenol-formaldehyde condensation product containing from 2 to 2.3 mols of formaldehyde for each mol of phenol, then first adding a water solution of barium hydroxide and thereafter adding sulfuric acid in an amount just sufficient to react with all the barium hydroxide present and form and suspend barium sulfate in the aqueous medium, the total quantity of barium sulfate so formed being at least sufficient to give the mass a specific gravity of 1.4 after the water content has been reduced to on the order of 6 percent or less, acidifying the mass and distilling the mass under vacuum to remove water until the white and water insoluble barium sulfate becomes invisible to the unaided eye, all of the barium sulfate in said mass distilled under vacuum having been formed by chemical reaction in said aqueous medium containing the condensation product.

2. A process which consists of condensing together phenol and formaldehyde in the presence of an alkaline catalyst to form an aqueous solution of a water soluble phenol-formaldehyde condensation product containing from 2 to 2.3 mols of formaldehyde for each mol of phenol, then adding barium hydroxide and just sufficient sulfuric acid to react with the barium hydroxide present and form and suspend barium sulfate in the aqueous medium, the total quantity of barium sulfate so formed being at least sufficient to give the mass a specific gravity of 1.4 after the water content of the mass has been decreased to on the order of 6 percent or less, adding acid in an amount sufficient to give the mass a weakly acid pH and then distilling the mass under a pressure reduced to at least 60 millimeters to remove water until sufficient water has been removed so that the boiling point of the mass is from about 75° to 80° C. at a pressure of the order of 60 millimeters and thereafter hardening the product at a temperature of about 75° to 85° C.

3. A process which consists of dissolving 440 parts, by weight, of phenol, 836 parts, by weight, of 37 percent formaldehyde solution and 33 grams of barium hydroxide in water, reacting the phenol and formaldehyde at elevated temperature to form a water soluble resin, then adding 446 parts, by weight, of barium hydroxide dissolved in water and just sufficient sulfuric acid to react with the barium hydroxide present, then adding 6.84 parts, by weight, of 90 percent lactic acid and boiling the mixture under a vacuum of about 70 millimeters and continuing the boiling until the temperature has risen to about 75° to 80° C. with a vacuum on the order of 60 millimeters, and then hardening the resulting composition in molds at a temperature of 75° to 85° C. for 48 to 60 hours.

4. A process which consists of condensing together phenol and formaldehyde in the presence of a barium hydroxide catalyst to form an aqueous solution of a water soluble phenol-formaldehyde condensation product containing about 2.2 mols of formaldehyde to each mol of phenol, then adding an aqueous solution of barium hydroxide and just sufficient sulfuric acid to react with the barium hydroxide present and form and suspend barium sulfate in the aqueous medium, the total quantity of barium sulfate so formed being sufficient to give the mass a specific gravity of at least 1.7 after the water content of the mass has been decreased to below 6 percent, adding lactic acid in an amount sufficient to give the mass a weakly acid pH and then distilling the mass under a pressure reduced to at least 70 millimeters to remove water until sufficient water has been removed so that the boiling point of the mass is from about 75° to 80° C. at a pressure of the order of 60 millimeters, and thereafter hardening the product for from 48 to 60 hours at a temperature of about 75° to 85° C.

5. A process which comprises condensing together phenol and formaldehyde in the presence of an alkaline catalyst to form an aqueous solution of a water soluble phenol-formaldehyde condensation product containing from 2 to 2.3 mols of formaldehyde for each mol of phenol, forming and suspending barium sulfate in the aqueous medium containing the condensation product by chemical reaction of a barium salt and sulphuric acid in a quantity sufficient to give the mass a specific gravity of at least 1.4 after the water content of the mass has been decreased to on the order of 6 percent, acidifying the mass, and thereafter distilling the mass under vacuum at least until all of said white and water insoluble barium sulfate becomes invisible to the unaided eye.

6. A process which comprises condensing together phenol and formaldehyde in the presence of an alkaline catalyst to form an aqueous solution of a water soluble phenol-formaldehyde condensation product containing from 2 to 2.3 mols of formaldehyde for each mol of phenol, then adding barium hydroxide and sulfuric acid to form and suspend barium sulfate in the aqueous medium, the quantity of sulfuric acid added being just sufficient to react with the barium hydroxide present, and the total quantity of barium sulfate so formed being at least sufficient to give the mass a specific gravity of 1.7 after the water content has been reduced to on the order of 6 percent or less, then acidifying the mass and distilling under vacuum at least until all of said barium sulfate becomes invisible to the unaided eye.

7. A composition of matter consisting of the combination of a reaction product of phenol and formaldehyde with a quantity of barium sulfate sufficient to give the composition a specific gravity of at least 1.7, said barium sulfate being in a state such that it is invisible to the unaided eye, and said phenol-formaldehyde reaction product containing 2.2 mols of formaldehyde for each mol of phenol.

8. A hard composition of matter consisting of the combination of a reaction product of phenol and formaldehyde with a quantity of barium sulfate sufficient to give the composition a specific gravity of at least 1.7, said barium sulfate being in a state such that it is invisible to the unaided eye, said phenol-formaldehyde reaction product containing 2.2 mols of formaldehyde for each mol of phenol, and said composition containing a quantity of water less than about 6 percent.

9. A composition of matter comprising a reaction product of phenol and formaldehyde containing from 2 to 2.3 mols of formaldehyde for each mol of phenol and including a quantity, by weight, of barium sulfate sufficient to give the composition a specific gravity of at least 1.4, said barium sulfate being in a state such that it is invisible to the unaided eye and said composition being transparent when substantially free of water and materials other than said reaction product and said metal salt and hardened to a solid state.

10. A composition of matter comprising a reaction product of phenol and formaldehyde in which there are from 2 to 2.3 mols of formaldehyde to each mol of phenol and including a quantity of barium sulfate sufficient to give the composition a specific gravity of at least 1.4, said barium sulfate being in a state such that it is invisible to the unaided eye.

HAROLD J. LUTH.
KENNETH J. GREGORY.